United States Patent
Tian et al.

(10) Patent No.: US 10,394,714 B2
(45) Date of Patent: *Aug. 27, 2019

(54) SYSTEM AND METHOD FOR FALSE SHARING PREDICTION

(71) Applicant: Futurewei Technologies, Inc., Plano, TX (US)

(72) Inventors: Chen Tian, Union City, CA (US); Tongping Liu, Amherst, MA (US); Ziang Hu, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,524

(22) Filed: Dec. 29, 2016

(65) Prior Publication Data

US 2017/0109288 A1 Apr. 20, 2017

Related U.S. Application Data

(63) Continuation of application No. 14/341,438, filed on Jul. 25, 2014, now Pat. No. 9,547,599.

(Continued)

(51) Int. Cl.
*G06F 12/00* (2006.01)
*G06F 12/0842* (2016.01)
(Continued)

(52) U.S. Cl.
CPC ......... *G06F 12/0842* (2013.01); *G06F 8/443* (2013.01); *G06F 11/3003* (2013.01); *G06F 11/3037* (2013.01); *G06F 11/3065* (2013.01); *G06F 11/3089* (2013.01); *G06F 11/3466* (2013.01); *G06F 11/3471* (2013.01);
(Continued)

(58) Field of Classification Search
None
See application file for complete search history.

(56) References Cited

U.S. PATENT DOCUMENTS 6,195,765 B1 * 2/2001 Kislanko ............. G06F 11/3664
703/22
7,200,542 B1 4/2007 Thompson et al.
(Continued)

FOREIGN PATENT DOCUMENTS

CN 102439567 A 5/2012
CN 102681948 A 9/2012
(Continued)

OTHER PUBLICATIONS

Liu, et al., "PREDATOR, Predicitive False Sharing Detection," Newsletter ACM SIGPLAN Notices—PPoPP '14, vol. 49, Issue 8, Aug. 2014, pp. 3-14.
(Continued)

*Primary Examiner* — Jason W Blust
(74) *Attorney, Agent, or Firm* — Slater Matsil, LLP

(57) ABSTRACT

In one embodiment, a method for predicting false sharing includes running code on a plurality of cores and determining whether there is potential false sharing between a first cache line and a second cache line, and where the first cache line is adjacent to the second cache line. The method also includes tracking the potential false sharing and reporting the potential false sharing.

20 Claims, 14 Drawing Sheets

Related U.S. Application Data

(60) Provisional application No. 61/858,857, filed on Jul. 26, 2013.

(51) Int. Cl.
*G06F 8/41* (2018.01)
*G06F 11/30* (2006.01)
*G06F 11/34* (2006.01)
*G06F 12/0844* (2016.01)

(52) U.S. Cl.
CPC ...... *G06F 12/0844* (2013.01); *G06F 11/3093* (2013.01); *G06F 11/3428* (2013.01); *G06F 2201/865* (2013.01); *G06F 2201/885* (2013.01); *G06F 2212/1016* (2013.01); *G06F 2212/507* (2013.01)

(56) References Cited

U.S. PATENT DOCUMENTS

| | | | |
|---|---|---|---|
| 8,359,291 | B2 | 1/2013 | Dayan et al. |
| 2005/0155021 | A1 | 7/2005 | DeWitt, Jr. et al. |
| 2011/0283152 | A1 | 11/2011 | Citron et al. |
| 2012/0089785 | A1 | 4/2012 | Cho et al. |
| 2012/0210073 | A1 | 8/2012 | Eichenberger et al. |
| 2012/0254551 | A1 | 10/2012 | Kasahara et al. |
| 2015/0032971 | A1 | 1/2015 | Tian et al. |

FOREIGN PATENT DOCUMENTS

| | | |
|---|---|---|
| CN | 102713846 A | 10/2012 |
| EP | 2439646 A1 | 4/2012 |

OTHER PUBLICATIONS

Berger, E. D., et al., "Hoard: A Scalable Memory Allocator for Multithreaded Applications," Proceedings of the International Conference on Architectural Support for Programming Languages and Operating Systems (ASPLOS-IX), Nov. 12-15, 2000, pp. 117-128.
Berger, E. D., et al., "Composing High-Performance Memory Allocators," Proceedings of the ACM SIGPLAN 2001 Conference on Programming Language Design and Implementation, PLDI '01, Jun. 20-22, 2001, pp. 114-124.
Bruening, D., et al., "An Infrastructure for Adaptive Dynamic Optimization," Proceedings of the International Symposium on Code Generation and Optimization: Feedback-Directed and Runtime Optimization, CGO '03, Mar. 23-26, 2003, pp. 265-275.
Chow, J-H., et al., "False Sharing Elimination by Selection of Runtime Scheduling Parameters," ICPP '97: Proceedings of the International Conference on Parallel Processing, Aug. 11-15, 1997, pp. 396-403.
Günther, S.M., et al., "Assessing Cache False Sharing Effects by Dynamic Binary Instrumentation," Proceedings of the Workshop on Binary Instrumentation and Applications (WBIA), Dec. 12, 2009, pp. 26-33.
Intel, "Avoiding and Identifying False Sharing Among Threads," http://software.intel.com/en-us/articles/avoidng-and-identifying-false-sharing-among-threads/, Feb. 2010, pp. 1-5.
Intel, "Intel Performance Tuning Utility 4.0 Update 5," http://software.intel.com/en-us/articles/intel-performance-tuning-utility, downloaded Jul. 17, 2013, pp. 1-5.
Intel, "Extreme Tuning Utility 3.2," Intel Extreme Tuning Utility 2.0—Release Notes, http://downloadmirror.intel.com/21743/eng/XTU-3_2-ReleaseNotes.htm, Apr. 15, 2015, pp. 1-3.
Iskhodzhanov, T., et al., "Combining Compile-Time and Run-Time Instrumentation for Testing Tools," 2013 Programmnye Produkty i Sistemy, vol. 3, pp. 224-231.
Jayasena, S., et al., "Detection of False Sharing Using Machine Learning," Proceedings of International Conference for High Performance Computing, Networking, Storage and Analysis, (SC13), Nov. 17-21, 2013, pp. 30:1-30:9.
Jeremiassen, T. E., et al., "Reducing False Sharing on Shared Memory Multiprocessors through Compile Time Data Transformations," Proceedings of the Fifth ACM SIGPLAN Symposium on Principles and Practice of Parallel Programming, (PPOPP '95), Jul. 19-21, 1995, pp. 179-188.
Lattner, C., et al., "LLVM: A Compilation Framework for Lifelong Program Analysis & Transformation," Proceedings of the International Symposium on Code Generation and Optimization: Feedback-Directed and Runtime Optimization (CGO '04), Mar. 20-24, 2004, 12 pages.
Liu, C-L., "False Sharing Analysis for Multithreaded Program," Master's thesis, National Chung Cheng University, Jul. 2009, 64 pages.
Liu, T., et al., "Sheriff: Precise Detection and Automatic Mitigation of False Sharing," Proceedings of the 2011 ACM International Conference on Object Oriented Programming Systems Languages and Applications (OOPSLA '11), Oct. 22-27, 2011, pp. 3-18.
Luk, C-K., et al., "Pin: Building Customized Program Analysis Tools with Dynamic Instrumentation," Proceedings of the 2005 ACM SIGPLAN Conference on Programming Language Design and Implementation (PLDI '05), Jun. 11-15, 2005, pp. 190-200.
Nanavati, M., et al., "Whose Cache Line is it Anyway? Operating System Support for Live Detection and Repair of False Sharing," Proceedings of the 8th ACM European Conference on Computer Systems (EuroSys '13), Apr. 14-17, 2013, pp. 141-154.
Nethercote, N., et al., "Valgrind: A Framework for Heavyweight Dynamic Binary Instrumentation," Proceedings of the 2007 ACM SIGPLAN Conference on Programming Language Design and Implementation (PLDI '07), Jun. 11-13, 2007, pp. 89-100.
Papadimitriou, K., "Taming False Sharing in Parallel Programs," Master's thesis, University of Edinburgh, 2009, 109 pages.
Pesterev, A., et al., "Locating Cache Performance Bottlenecks Using Data Profiling," Proceedings of the 5th European Conference on Computer Systems (EuroSys '10), Apr. 13-16, 2010, pp. 335-338.
Schindewolf, M., et al., "A Generic Tool Supporting Cache Design and Optimisation on Shared Memory Systems," 9th Workshop on Parallel Systems and Algorithms (PASA), Workshop of the GI/ITG Special Interest Groups PARS and PARVA, held at the 21st Conference on the Architecture of Computing Systems (ARCS), Feb. 26th, 2008, pp. 69-79.
Serebryany, K., et al., "AddressSanitizer: A Fast Address Sanity Checker," Proceedings of the 2012 USENIX Conference on Annual Technical Conference, (USENIX ATC '12), Jun. 13-15, 2012, pp. 28-37.
Wikipedia, "Instrumentation," Wikipedia, the Free Encyclopedia, http://en.wikipedia.org/wiki/Instrumentation, downloaded Jul. 17, 2013, pp. 1-7.
Zhao, Q., et al., "Dynamic: Cache Contention Detection in Multithreaded Applications," The International Conference on Virtual Execution Environments, Mar. 9-11, 2011, 11 pages.
International Search Report, Application No. PCT/CN2014/083094, dated Dec. 19, 2014, 13 pages.
"Instrumentation," Wikipedia, downloaded Jul. 17, 2013, 7 pgs.
"Intel Performance Tuning Utility 4.0 Update 5," Intel Developer Zone, downloaded Jul. 17, 2013, 5 pgs.

\* cited by examiner

SYSTEM AND METHOD FOR FALSE SHARING PREDICTION

CROSS-REFERENCE TO RELATED APPLICATIONS

This application is a continuation of U.S. application Ser. No. 14/341,438 filed on Jul. 25, 2014, which claims the benefit of U.S. Provisional Application Ser. No. 61/858,857 filed on Jul. 26, 2013, and entitled "System and Method for False Sharing Prediction," which application is hereby incorporated herein by reference.

TECHNICAL FIELD

The present invention relates to a system and method for multithreading, and, in particular, to a system and method for predicting false sharing.

BACKGROUND

Multithreading on multiple cores is often used in computing. Multiple cores are used in a variety of devices, including smart phones, tablets, laptops, workstations, supercomputers, and data centers. Multithreading is a programming and execution model which utilizes the underlying hardware resources by running different threads on different hardware cores concurrently. These threads may share data, files, and input/output (I/O) in order to facilitate cooperatively completing a specified task.

One challenge in multithreading is false sharing, which is related to cache usage. Cache, which is accessed much faster than main memory, is used by central processing units (CPUs) to accelerate program executions. Before accesses, the CPU checks whether the data to be accessed is in the cache. When the data is already stored in the cache, the CPU directly accesses the data from the cache, reducing access latency by avoiding accessing the slower main memory. When the data is not already stored in the cache, the CPU automatically fetches the data to the cache from the main memory in blocks of a fixed size, referred to as cache lines.

In an example multicore system, the cores have their own private caches. Thus, data accessed by threads running on different cores may be duplicated in caches of those involved cores. A cache coherence protocol is invoked to facilitate correct accesses from different threads concurrently. When the data of a cache line in one core has been changed, the cache coherence protocol invalidates other copies of the same cache line in other cores so changes made by one core are seen by the other cores.

This cache line level coherency creates a false sharing problem. When threads running on different cores access different locations in the same cache line, every write by one core on the cache line invalidates the cache line copies on the other core. As a result, frequent cache line invalidation may degrade performance, because other cores with their cache entries invalidated have to re-fetch the data from the main memory, using CPU time and memory bandwidth. Also, false sharing may further degrade performance when a system has more cores or a larger cache line size.

SUMMARY

An embodiment method for predicting false sharing includes running code on a plurality of cores and determining whether there is potential false sharing between a first cache line and a second cache line, and where the first cache line is adjacent to the second cache line. The method also includes tracking the potential false sharing and reporting the potential false sharing.

An embodiment method for predicting false sharing includes performing a first access to a first cache line by a first thread and performing a second access to a second cache line by a second thread, where the first cache line is adjacent to the second cache line. The method also includes determining a distance between the first access and the second access and identifying a potential false sharing incident when the distance between the first access and the second access is less than a size of the first cache line.

An embodiment computer includes a first processor and a second processor. The computer also includes a non-transitory computer readable storage medium storing programming for execution by the first processor and the second processor, where the programming includes instrumentation. The programming includes instructions to determine whether there is potential false sharing between a first cache line and a second cache line, and where the first cache line is adjacent to the second cache line. The programming also includes instructions to track the potential false sharing and report the potential false sharing.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment predicts potential false sharing which does not manifest in an initial execution, but may appear and significantly degrade the performance of programs in slightly different environments. Predictive false sharing generalizes from a single execution to identify potential false sharing instances which are caused by slight changes in object placement and alignment. Also false sharing may be predicted in hardware platforms with large cache line sizes by tracking accesses within virtual cache lines which span multiple physical lines.

Figure 1:
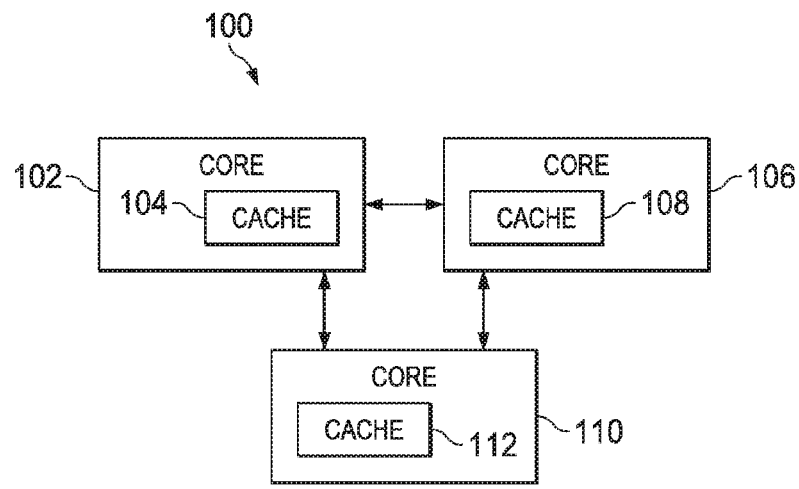
FIG. 1 illustrates an embodiment multicore system.

Multithreading in multicore systems increases the processing speed. FIG. 1 illustrates multicore system 100 containing three cores, core 102, core 106, and core no. The cores may communicate with each other in performing computations. Separate tasks are performed on the different cores. The cores have their own cache. For example, core 102 has cache 104, core 106 has cache 108, and core no has cache 112. Three cores are pictured, but fewer or more cores may be used (e.g., 2, 4, 8, etc.). When a core accesses data, it examines its cache to determine whether the data is already stored in its cache. When the data is already in the cache, the core reads the data from the cache. However, when the data is not already in the cache, the core downloads the data from main memory to the cache, and then accesses the data.

Figure 2:
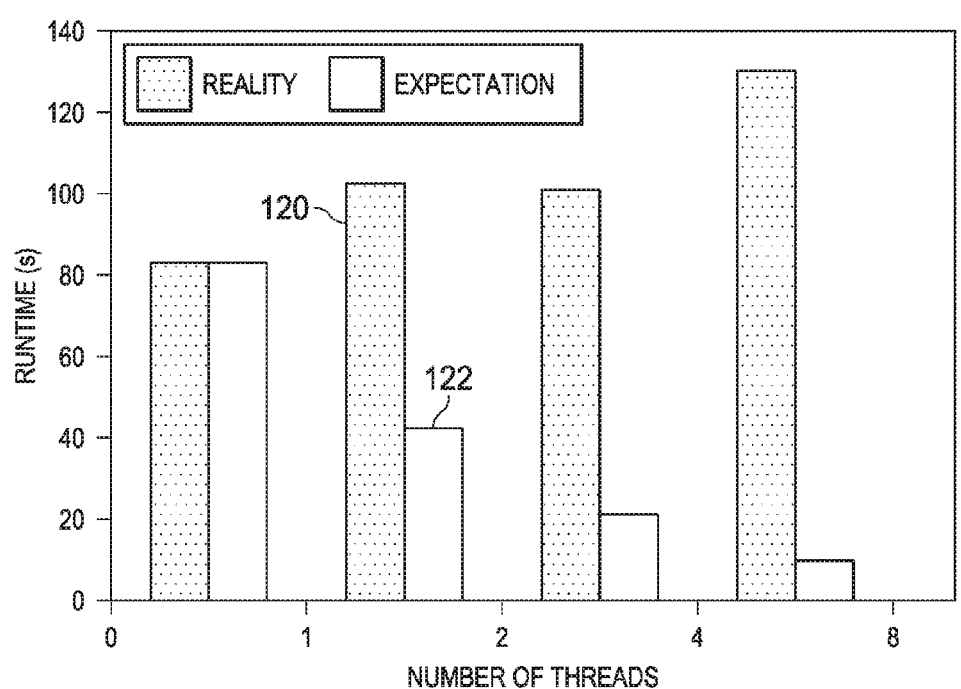
FIG. 2 illustrates a graph of runtime versus the number of threads in a multicore system.

It is desirable to have more threads to reduce the runtime. However, because of multithreading issues, such as false sharing, the runtime does not increase rapidly. FIG. 2 illustrates a graph of actual runtime 120 and expected runtime 122 based on the number of threads. False sharing slows the program by 13 times with 8 threads.

False sharing may occur due to code. For example, software which leads to false sharing is:

```
int count[8]
int W;
void increments(int S)
{
    for(in=S; in<S+W; in++)
        for(j=o; j<1M; j++)
            count[in]++;
}
int main(int THREADS) {
    W=8/THREADS;
    for(i=o; i<8; i+=W)
        spawn(increment,i);
```

Figure 3:
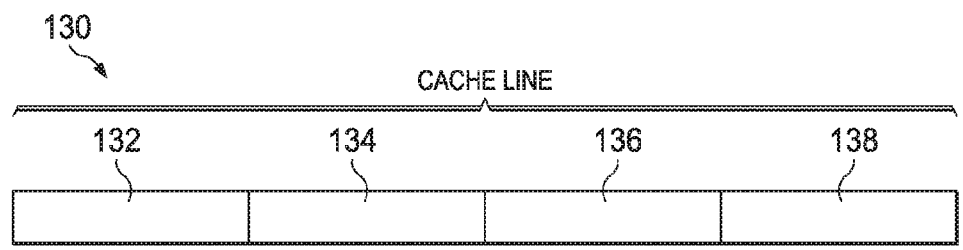
FIG. 3 illustrates a cache line.
Figure 4:
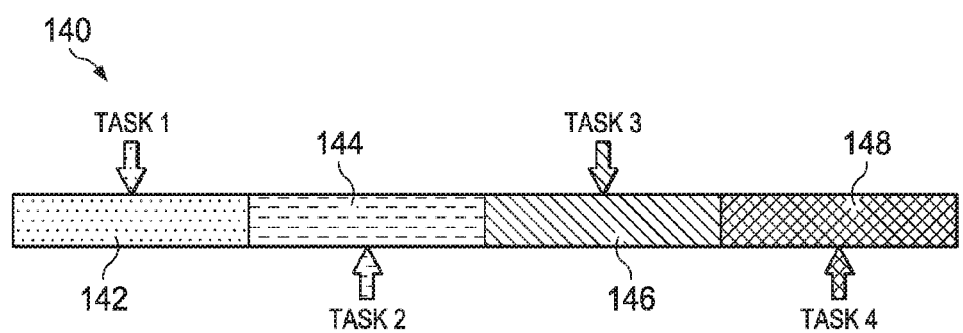
FIG. 4 illustrates false sharing in a cache line.
Figure 5:
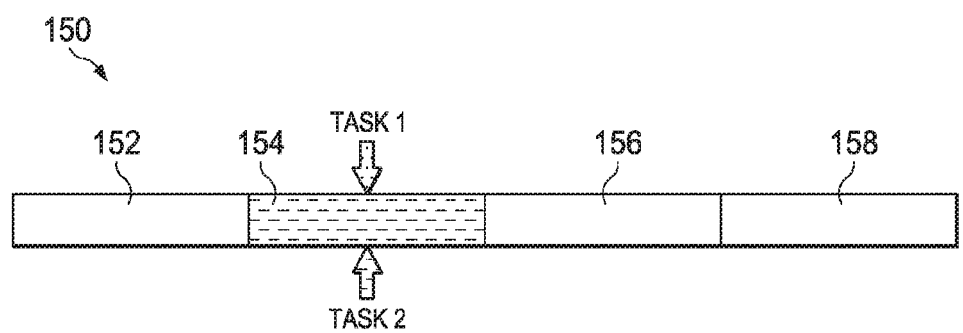
FIG. 5 illustrates true sharing in a cache line.

FIG. 3 illustrates cache line 130 with cache words 132, 134, 136, and 138. In one example, a cache line has 64 bytes and 8 words of 8 bytes. False sharing occurs when different threads update or access different words in the same cache line. FIG. 4 illustrates an example of false sharing. Task 1 accesses word 142 in cache line 140, task 2 accesses word 144 in cache line 140, task 3 accesses word 146 in cache line 140, and task 4 accesses word 148 in cache line. In true sharing, different threads update or access the same word in the same cache line. FIG. 5 illustrates an example of true sharing. Task 1 and task 2 both access word 154 in cache line 150, which also includes words 152, 156, and 158. False share degrades performance, while true sharing does not. For example, false sharing slows MySQL™ by 50%.

Figure 6A:
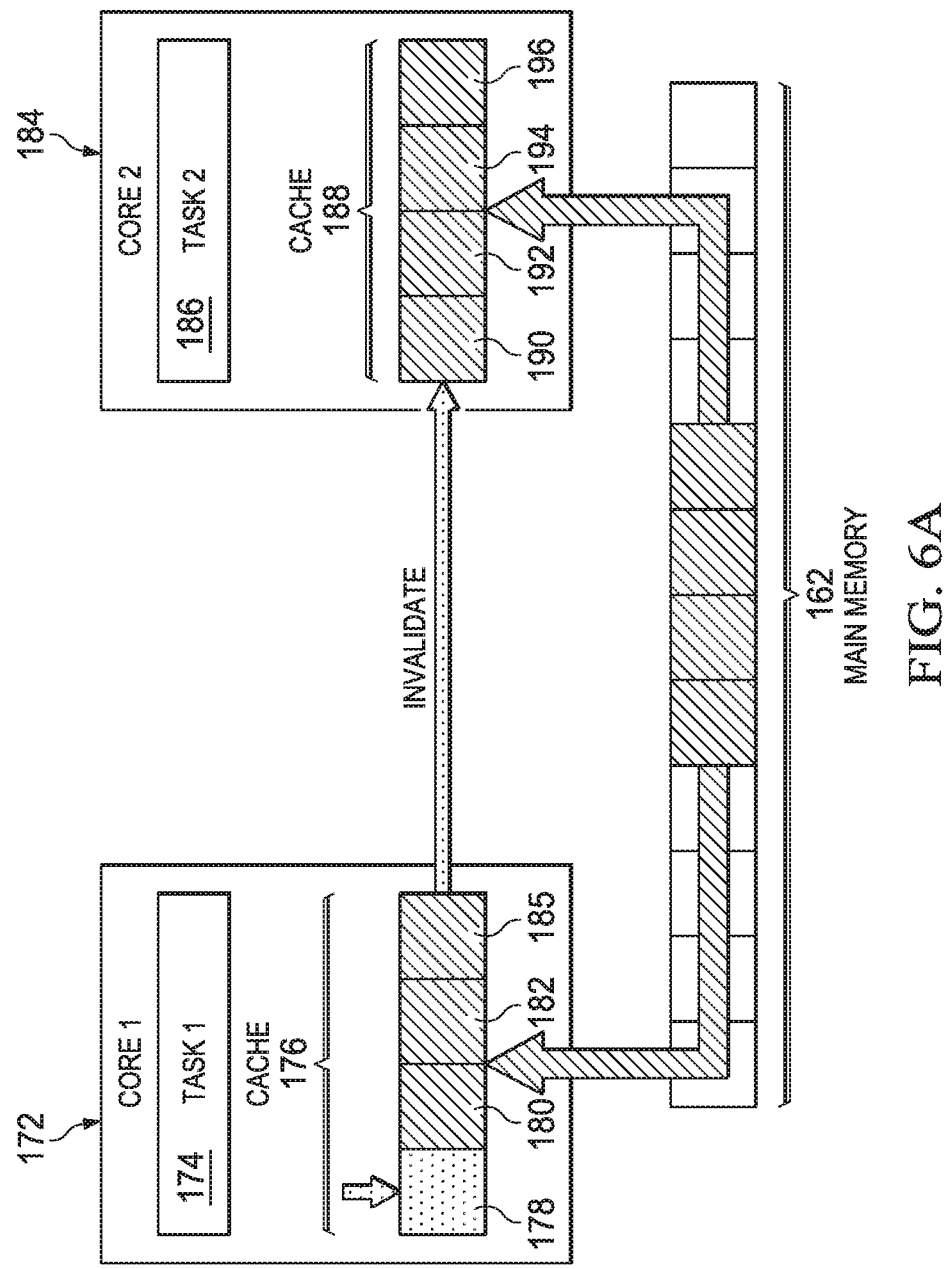
FIGS. 6A-B illustrate cache invalidation in multiple cores.
Figure 6B:
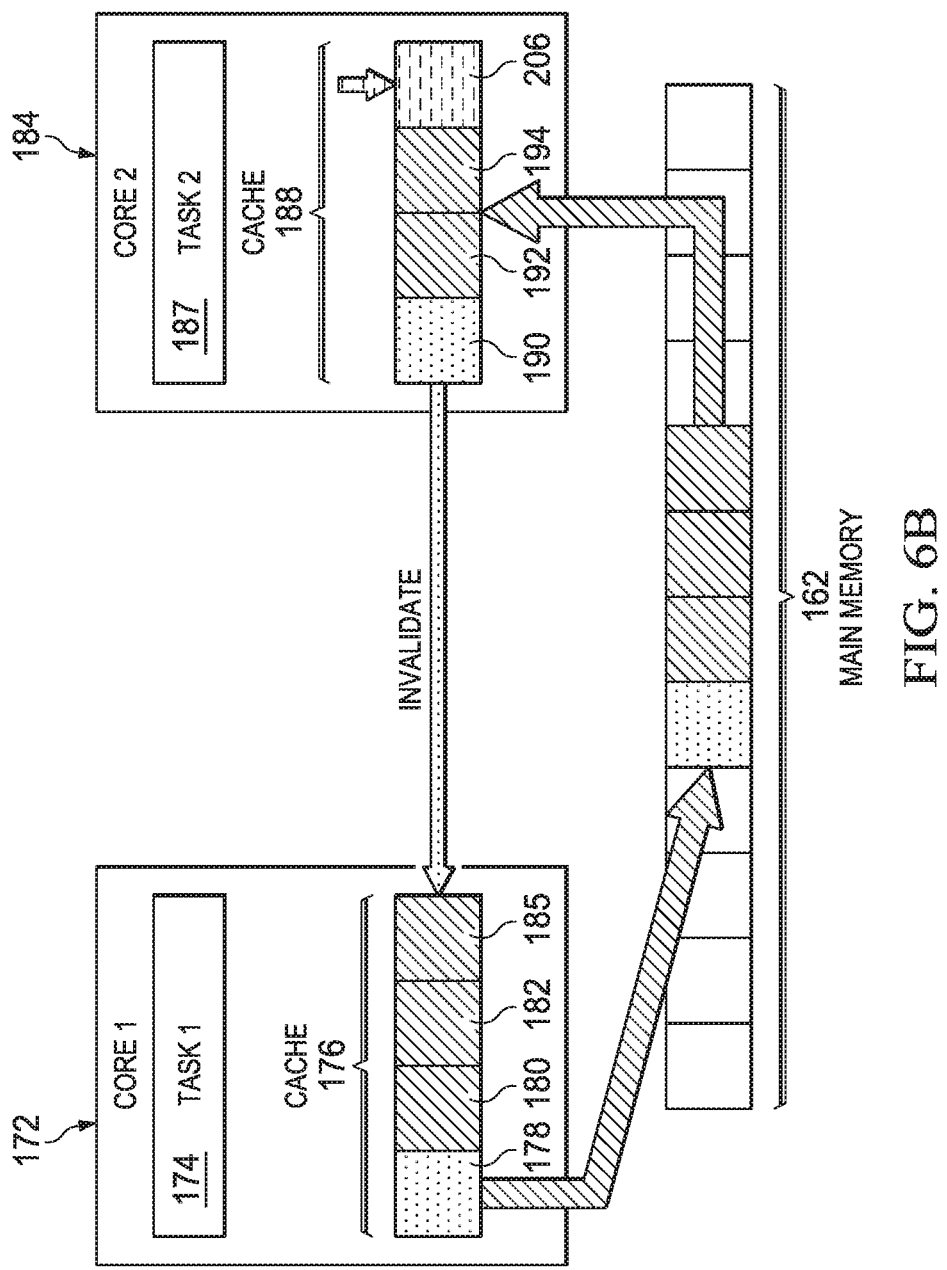

FIGS. 6A-B illustrate an example false sharing with two threads. Task 174 runs on core 172 and task 186 runs on core 184. Core 172 has its own cache, with cache line 176 having words 178, 180, 182, and 185. Likewise, core 184 has its own cache, with cache line 188 having words 190, 192, 194, and 196. Cache may be located in the same chip as the processor, and has higher access speeds than the main memory, such as main memory 162. When data is fetched to the cache from the main memory, it is fetched in units of cache lines. For example, a cache line may be 32 bytes, 64 bytes, 128 bytes, or another number of bytes. The use of cache lines with a particular size may reduce the number of fetches.

However, cache lines may cause performance problems when there is false sharing. Different cache coherence protocols handle updates differently. Examples of cache protocols used for cache invalidation include modified shared invalid (MSI) protocol and modified exclusive shared invalid (MESI) protocol. In the MSI protocol, the cache lines may have three possible states: modified, shared, or invalid. In the modified state, the block has been modified in the cache, and the data in the cache is inconsistent with that in the main memory. A cache line with a modified state has the responsibility to write the block to the main memory when it is evicted. In a shared state, the cache line is unmodified and exists in at least one cache. The cache in the shared state may evict the data without writing it to the main memory. In the invalid state, the cache line is invalid, and should be fetched from memory or another cache. In the MESI protocol, cache lines may be modified, exclusive, shared, or invalid. When a cache line is exclusive, the cache line is present only in the current cache, but it matches the main memory. In one example, the state is changed to shared in response to a read request. Alternatively, it is changed to modified when written to. In both protocols, when a cache line is written to, it goes to the invalidate state. For example, task 174 writes to word 178 in cache line 176. Core 184 has a copy of the same data in its cache. The data is invalidated to ensure correct data for the case of true sharing. However, invalidation is unnecessary for false sharing.

When task 2 access data in cache line 188, for example in FIG. 6B, task 187 fetches the data from core 172. Likewise, when task 186 modifies word 206 in cache line 188, the data in core 172 is invalidated, and is read from the main memory. When there are many interleaved writes from different threads, there may be many cache invalidations. The large number of cache invalidations may cause serious performance problems. As the number of cores increases or the cache line size increases, false sharing becomes more problematic.

False sharing occurs in a variety of situations. For example, false sharing may occur on struct fields, two different global variables, two different heap objects, two different fields of the same structure, or two different elements of the same array. Some situations which may lead to false sharing include:

```
me = 1;
you = 1; // globals
me = new Foo;
you − new Bar; // heap
class X {
    int me;
    int you;
}; // fields
array[me] = 12;
array[you] = 13; // array indices
```

False positives occur in runtime, and are not visible from the source code.

Figure 7:
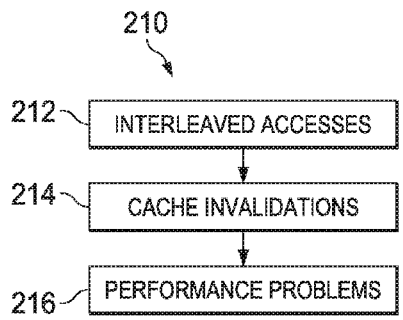
FIG. 7 illustrates interleaved access leading to performance problems.

False sharing may causes performance problems. FIG. 7 illustrates flowchart 210 indicating how false sharing causes performance problems. In step 212, interleaved access causes cache invalidations 214. These cache invalidations cause performance problems 216.

Figure 8:
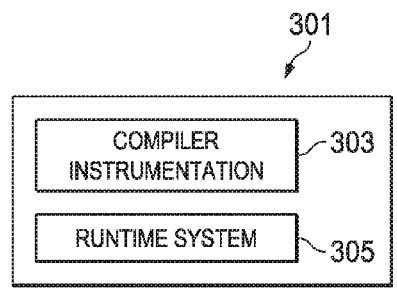
FIG. 8 illustrates an embodiment system for false sharing detection.

An embodiment method of false sharing detection is referred to as predator. System 301 illustrated by FIG. 8 includes compiler instrumentation 303 and runtime system 305. The compiler instrumentation is inserted into the source code to track memory read and write accesses. When there is a memory access, the runtime system is notified, for example using a library call. The runtime system collects memory accesses, updates corresponding invalidations, and reports false sharing. The callsites of the memory allocations are saved. Graphing memory access helps separate false sharing from true sharing.

A compiler may capture instructions accessing global variables and heap objects. Other information, such as when those instruments are being executed or how many times a variable or pointer is accessed, is not determined during the compiling phase, because this information depends on the input parameter or execution environment. Such dynamic information is used to detect false sharing. The runtime system captures when instructions are executed and how many times a variable or a pointer is accessed. An embodiment combines a runtime system and compiler instrumentation to provide detailed information to detect false sharing in applications.

In an embodiment, a compiler selectively instruments read and write accesses of global variables and pointers. Instrumentation refers to using the compiler to insert function callbacks into the source code, for example when the application invokes read and write accesses on global variables or heap variables. Callback functions facilitate the runtime system collecting memory read and write information. Thus, an embodiment detects false sharing problems.

Figure 9:
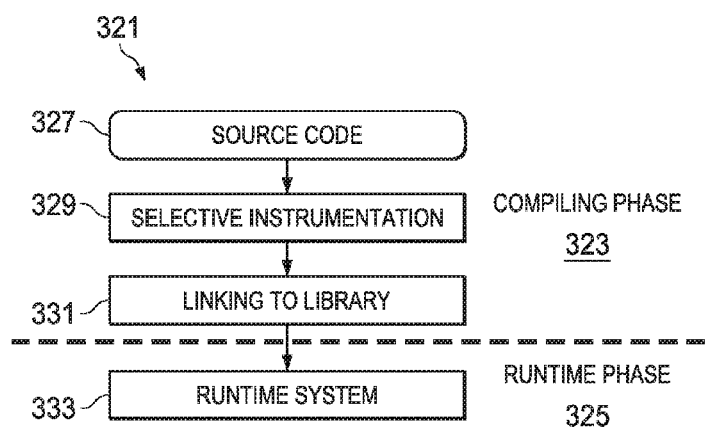
FIG. 9 illustrates a flowchart for an embodiment method of false sharing detection.

FIG. 9 illustrates flowchart 321 for a method of detecting false sharing. Flowchart 321 includes compiling phase 323 and runtime phase 325. Compiling phase 323 includes source code 327, selective instrumentation 329, and linking library 331, while runtime phase 325 includes runtime system 333. Source code 327 is the source code where false sharing is to be avoided. Selective instrumentation 329 instruments source code 327 in a flexible fashion, so read and write accesses to the memory are provided to the runtime system. Selective instrumentation reduces performance overhead. This flexibility may be facilitated by making different decisions based on the access type, sampling target, and sampling optimization at different levels. Then, instrumentation is linked to a library in linking to library 331.

In one example, only write accesses are instrumented to detect write-write false sharing. Alternatively, both read and write accesses are instrumented to detect read-write false sharing problems as well as write-write false sharing problems. In read-write false sharing, one thread is writing to a cache line while other threads are reading from the same cache line.

Different sampling targets may be chosen, for example based on user input. In one example, all functions inside all modules are sampled. This leads to the runtime system obtaining all memory read and write information about the variables and objects at the expense of more performance overhead. In another example, a user provides a black list for some modules, functions, or variables not to be instrumented. The compiler skips instrumentation on the black listed items, which reduces the performance overhead from instrumentation. In another example, a user provides a red list for modules, functions, or valuables to be instrumented. The compiler selectively instruments the red listed items to reduce the performance overhead from the instrumentation. Different sampling targets may be selected to provide reasonable performance overhead. There is a tradeoff between performance and accuracy.

Sampling optimization may be performed on different levels. At the basic block level, sampling is selected once for multiple accesses to the same address. The compiler informs the runtime system how many accesses happen in the first basic block. Thus, the correct number of memory accesses in one basic block may be obtained if there is no flow switch inside the basic block. The sampling overhead may be thus reduced.

Because the compiler is leveraged for instrumentation, very fine grained information about every access may be obtained. For example, whether the access is to a specific word, byte, or bit may be determined. This information may be used to precisely locate false sharing in the reporting phase.

Runtime system 333 detects false sharing. Cache line invalidation is a root cause for performance degradation, because cache invalidations waste both CPU time and memory bandwidth. Therefore, an embodiment searches for the memory accesses which may introduce a large amount of cache line invalidation.

When a thread writes to a cache line immediately after other threads have accessed the same cache line, the write operation is likely to cause at least one cache invalidation. An embodiment data structure and method detects cache invalidations caused by interleaved access.

Instrumentation provides memory access information to the runtime system, which detects false sharing based on the sequence of memory accesses on the cache lines. The performance overhead of a specific program is proportional to the degree of instrumentation. More instrumentation leads to more performance overview.

In one embodiment, instrumentation is added once per type of memory access on addresses to the same basic block. This selective instrumentation may not affect the effectiveness of detection. Less tracking of accesses inside a basic block may induce fewer cache invalidations without impacting the overall behavior of cache invalidations.

Instrumentation may be dynamic instrumentation or compiler implementations. Dynamic instrumentation approaches may analyze the program's code before the execution to insert instrumentation. This introduces significant performance overhead, for example caused by run-time encoding and decoding, but provides good generality, because recompilation is not used. Compiler instrumentation inserts instrumentation during the compilation phase, which may have less generality.

Figure 10:
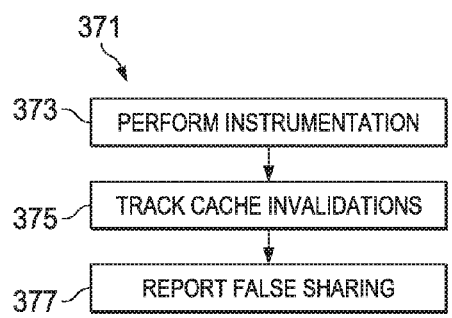
FIG. 10 illustrates a flowchart for another embodiment method of false sharing detection.

FIG. 10 illustrates flowchart 371 for a method of detecting false sharing. Initially, in step 373, instrumentation is performed in the compiler phase. An embodiment compiler uses low level virtual machine (LLVM) to perform instrumentation at the intermediate representation level. The compiler traverses functions one by one, searching for memory accesses, for example to global and heap variables. For memory accesses, a function is instrumented to invoke the runtime system with the memory access address and access type, read access or write access. In one example, accesses to stack variables is omitted, because stack variables may be used for local storage. Alternatively, accesses to stack variables are instrumented. In an example, the instrumentation is placed at the end of the LLVM optimization passes, so only memory accesses surviving previous LLVM optimization passes are instrumented.

Then, in step 375, cache invalidations are tracked. This is performed by the runtime system. The runtime system collects memory accesses by handling those function calls inserted during the compiler instrumentation phase. The cache invalidations are analyzed to determine whether they constitute false sharing.

Finally, in step 377, false sharing is reported. For global variables involved in false sharing, the name, address, and size are reported. For heap objects, the callsite stack for their allocations, their address, and size are reported. Also, the word granularity access information for cache lines involved in false sharing, including which threads accessed which words, may be shared. This information may assist in diagnosing and fixing false sharing.

Figure 11:
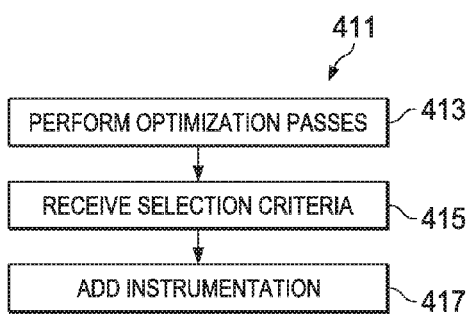
FIG. 11 illustrates a flowchart for an embodiment method of inserting instrumentation into source code.

FIG. 11 illustrates flowchart 411 for a method of applying instrumentation to the code during compilation. Initially, in step 413 optimization passes are performed on source code. For example, LLVM optimization is performed. In one example, the optimization passes are performed before the instrumentation is applied to the source code. Some or all of the optimization passes may be performed before the instrumentation is applied.

In step 415, selection criteria is received. For example, selection criteria may be received from a user. The selection criteria may include specific items to be instrumented. Alternatively, the selection criteria include specific items not to be instrumented. In another example, the selection criteria indicate that all items should be instrumented. The amount of instrumentation may be adjusted based on the user's requirements.

Finally, in step 417, instrumentation is inserted into the source code. The instrumentation is inserted to track cache line accesses. In one example, both read accesses and write accesses are tracked. Alternatively, only write accesses are tracked.

An embodiment data structure used to track cache invalidations is a two entry cache status table which tracks accesses for the cache lines. There may be one table per cache line. This table maintains the access history for the cache lines. The entries contain a thread identification number (ID) and an access type (read access or write access). The fields are used to update the table with new access.

Additional details on false sharing prediction are discussed in U.S. patent application Ser. No. 14/335,621 filed on Jul. 18, 2014, and entitled "System and Method for False Sharing Detection," which application is hereby incorporated herein by reference.

Figure 12:
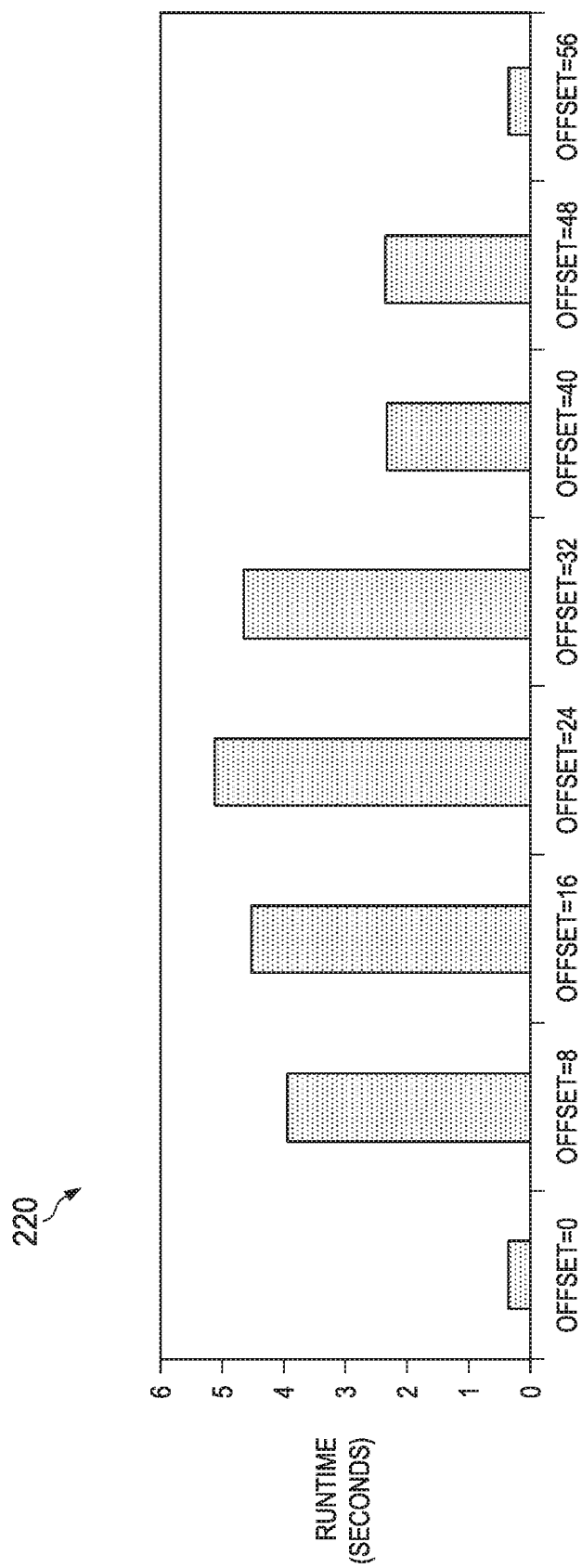
FIG. 12 illustrates a graph of performance of a benchmark versus offset of the starting address.
Figure 13:
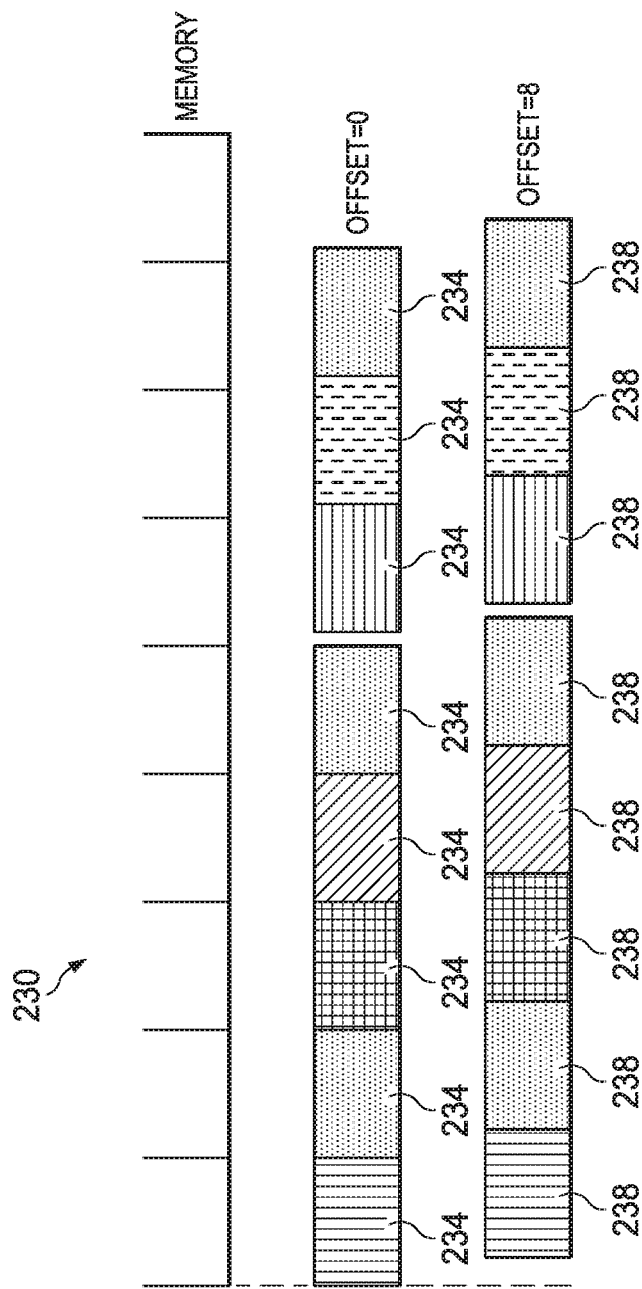
FIG. 13 illustrates thread offsets relative to a cache line.

The appearance of false sharing depends on the alignment between threads and corresponding cache lines. FIG. 12 illustrates graph 220 for runtime of a benchmark for various offsets between cache lines and threads. Also, FIG. 13 illustrates some example offsets. Memory 230 has 64 bit cache lines. Threads 234 have an offset of zero, while threads 238 have an offset of 8 bytes. A linear regression benchmark from the Phoenix benchmark suite is used to produce graph 220. Performance is highly sensitive to the offset of the starting address of a potentially falsely shared object and the start of the cache line. For this benchmark, when the offset of the starting address between the potentially falsely shared object and the corresponding cache lines is 0 or 56 bytes, there is no false sharing. When the offset is 24 bytes, there is the most false sharing. The performance difference between a 24 byte offset and a 0 byte offset is about fifteen times.

False sharing detection tools report observed false sharing, and may miss significant false sharing problems which occur when the offset of the starting address is different from the starting address in the test environment.

An embodiment predicts potential false sharing. Potential false sharing does not manifest in the current execution but may appear and significantly affect the program's performance in a different runtime environment.

Figure 14A:
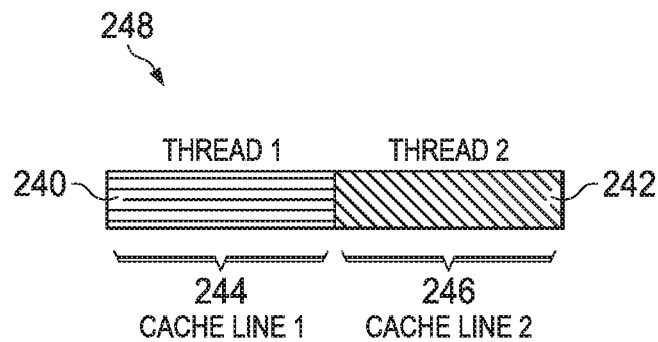
FIGS. 14A-C illustrates thread alignment relative to cache lines.
Figure 14B:
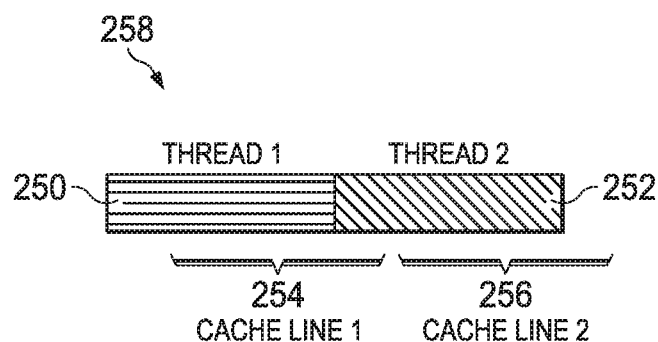
Figure 14C:
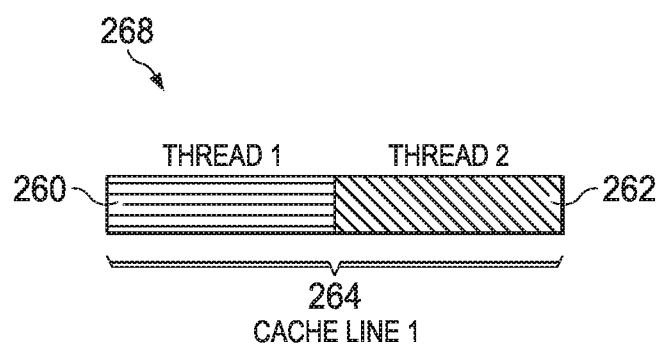

FIGS. 14A-C illustrate a simplified example of the impact of starting address alignment on false sharing. In FIG. 14A, thread 240 of object 248 is in cache line 244, while thread 242 of object 248 is in cache line 246. There is no false sharing, because thread 240 only updates cache line 244 and thread 242 only updates cache line 246.

However, false sharing appears in some other situations with the same cache pattern. FIG. 14B illustrates thread 250 of object 258 and thread 252 of object 258, which are not aligned with cache line 254 and cache line 256. When the starting address of the object is not aligned with the starting address of the cache line 254, both thread 250 and thread 252 may update cache line 256 simultaneously, causing false sharing.

Additionally, FIG. 14C illustrates thread 260 and thread 262 of object 268 both in cache line 264. When the size of a cache line doubles, the threads access the same cache line, and false sharing occurs. This is especially problematic when there is a large number of accesses on cache line 264.

A variety of dynamic factors affect false sharing. The memory layout affects false sharing. For example, changing between a 32 bit platform and a 64 bit platform, running a different platform with a different cache line size, running a platform with a different pointer size, having a different memory manager, compiler, optimization, or allocation order by changing the code may impact false sharing. Also, changing the cache line size affects false sharing. In an example, a printf command is added, and performance is significantly improved or degraded.

The starting address of a heap object is determined during execution. A virtual cache line with a starting address not be aligned with the cache line size to determine potential false sharing. The starting address of the virtual line may be changed. Changing the starting address changes the memory layout. Then, cache invalidations occurring on the virtual line are detected.

An embodiment predicts whether programs have potential false sharing when false sharing is caused by different dynamic properties. Dynamic properties besides the change in cache line size lead to different starting addressees of objects. Accesses to adjacent cache lines lead to potential false sharing. Cache invalidations occur when the cache line size or object starting address changes. When false sharing introduces a large number of cache invalidations it degrades performance.

Figure 15:
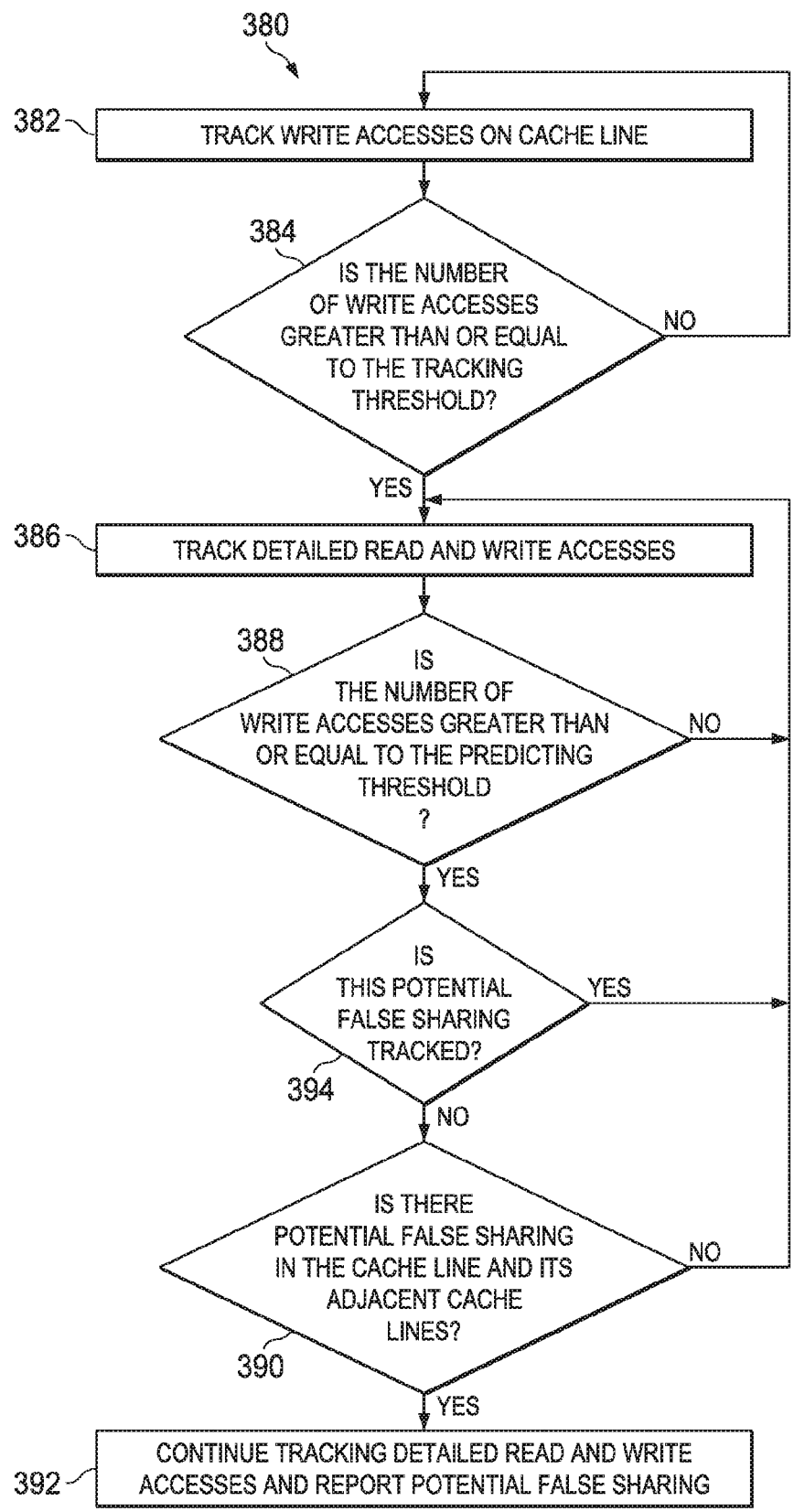
FIG. 15 illustrates a flowchart of an embodiment method of predicting false sharing.

FIG. 15 illustrates flowchart 380 for a method of detecting potential false sharing. Initially, in step 382, the system tracks write accesses only in a cache line. Read accesses are not yet tracked. Potential false sharing is unlikely unless there is a large number of write accesses.

Then, in step 384, the system determines whether the number of write accesses is greater than or equal to a tracking threshold. When the number of write accesses has not yet reached the tracking threshold, the system returns to step 382 to continue tracking write accesses. However, when the number of write accesses reaches the tracking threshold, the system proceeds to step 386 to track detailed read and write access information to the cache line and adjacent cache lines. For example, write accesses and read accesses to the cache line by word and thread are tracked. There may be potential false sharing between two adjacent cache lines, the forward cache line and the backward cache line. The backward possibility of false sharing indicates whether the accesses of the current cache line and the previous cache line have potential false sharing, while the forward possibility of false sharing indicates whether the accesses of the current cache line and the next cache line have potential false sharing.

In step 388, the system determines whether the number of write accesses is greater than or equal to a predicting threshold. The predicting threshold is greater than the tracking threshold. When the number of write accesses has not reached the predicting threshold, the system returns to step 386 to continue tracking detailed read and write access information. When the number of write accesses reaches the predicting threshold, the system proceeds to step 394.

In step 394, the system determines whether this instance of potential false sharing is already being tracked. When this potential false sharing is already being tracked, the system returns to step 386 to continue monitoring. When this potential false sharing is not already being tracked, the system proceeds to step 390.

In step 390, the system determines whether there is false sharing in the cache line or potential false sharing to the adjacent cache lines. The word access information tracked in step 386 is used to determine the potential false sharing. When potential false sharing is not found, the system returns to step 386 to continue detailed tracking of read and write information on the cache line and adjacent cache lines. When false sharing is found, the system proceeds to step 392 to continue tracking detailed information to confirm the false sharing.

A virtual cache line may be used to describe potential false sharing. A virtual cache line is a contiguous memory range spanning one or more physical cache lines. In the case of double cache line size, a virtual cache line is composed of two original contiguous cache lines, where the first cache line has an even index number. Thus, cache lines $2*i$ and $3*i+1$ form a virtual cache line. In the case of different starting addresses, a virtual line can have the same size as the physical lines, but is positioned arbitrarily. Unlike actual cache lines, the starting address of a virtual cache line does not need to be a multiple of the cache line size. For example, a 64 byte long virtual line may have the range [0, 64) bytes or [8, 72) bytes.

To search for potential false sharing problems, a hot access pair on a cache line and its adjacent cache lines is searched for by analyzing the detailed word access information. A hot access in a cache line refers to the word whose number of read or write accesses is larger than the average number of accesses to each word of the cache line L. Two accesses, X and Y, have a distance d between them. The distance d is less than a cache line size. X and Y are accesses by different threads. For hot access X in cache line L, another hot access Y is searched for in L's previous cache line or subsequent cache line satisfying three conditions. X and Y reside on the same virtual line, at least one of X and Y is a write access, and X and Y are issued by different threads.

An embodiment verifies potential false sharing by tracking cache invalidations on a potentially problematic virtual cache line. For potential false sharing caused by double cache line size, a virtual line is composed of the cache line with index $2*i$ and $2*i+1$. The cache invalidations on the virtual line on which false sharing has been discovered is tracked.

For the case of a change in starting address, two hot accesses with distances less than a cache line size can form multiple virtual cache lines. Thus, there is an additional step to determine which virtual line is to be tracked. Although the virtual line to be tacked is not a real cache line of actual hardware because of unaligned addresses, this virtual cache line is used to simulate the effect of changing the starting addresses of objects.

Figure 16:
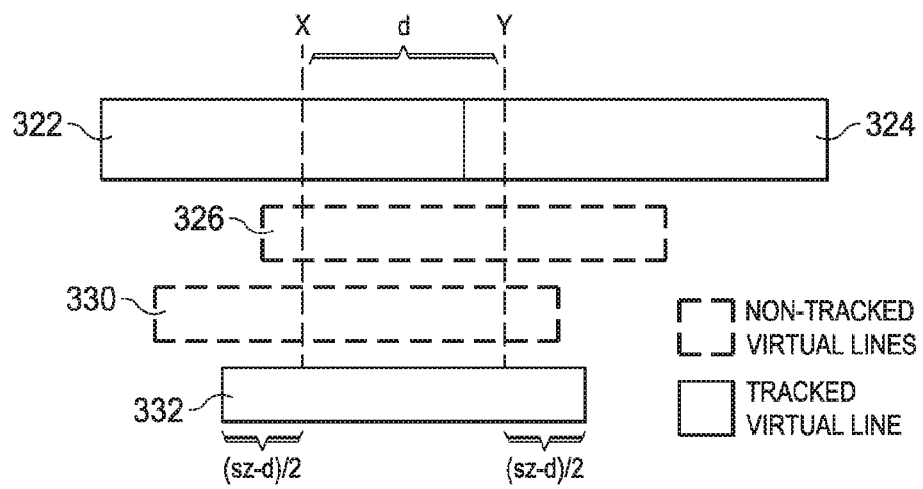
FIG. 16 illustrates virtual cache lines.

FIG. 16 illustrates virtual cache lines with size sz based on hot accesses X and Y. Non-tracked virtual lines 326 and 330 and tracked virtual line 332 span cache line 322 and cache line 324. Given X and Y, there are multiple virtual lines which may cover the two words. Only one virtual line is tracked. There is the same space before X and after Y in determining a virtual line. The virtual line starting at location $X-((sz-d)/2)$ and ending at $Y+((sz-d)/2)$ is tracked. This facilitates tracking of more possible cache invalidations caused by adjacent accesses of X and Y. Because adjusting the starting address of a virtual line has the same effect as adjusting the starting address of an object in detecting false sharing cache lines related to the same object are adjusted at the same time. An embodiment then tracks cache invalidations based on these adjusted virtual lines.

Figure 17:
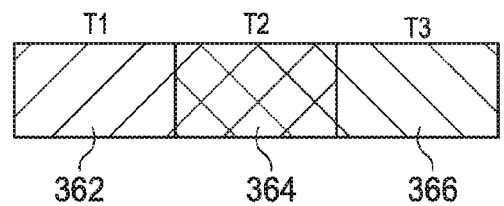
FIG. 17 illustrates threads.

There are a variety of access patterns which are likely to cause a false sharing problem. In one example, illustrated by FIG. 17, different threads access different locations with at least one write access. For example, thread 362, thread 364, and thread 366 access different locations in a cache line.

Figure 18:
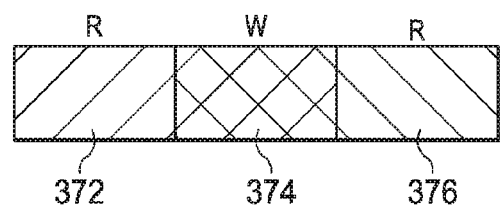
FIG. 18 illustrates cache line accesses.

In another example, locations with a large number of read or write accesses are close to locations with a large amount of write accesses, where at least two different threads perform the accesses. FIG. 18 illustrates read access 372, write access 374, and read access 376 which may lead to false sharing problems.

Figure 19:
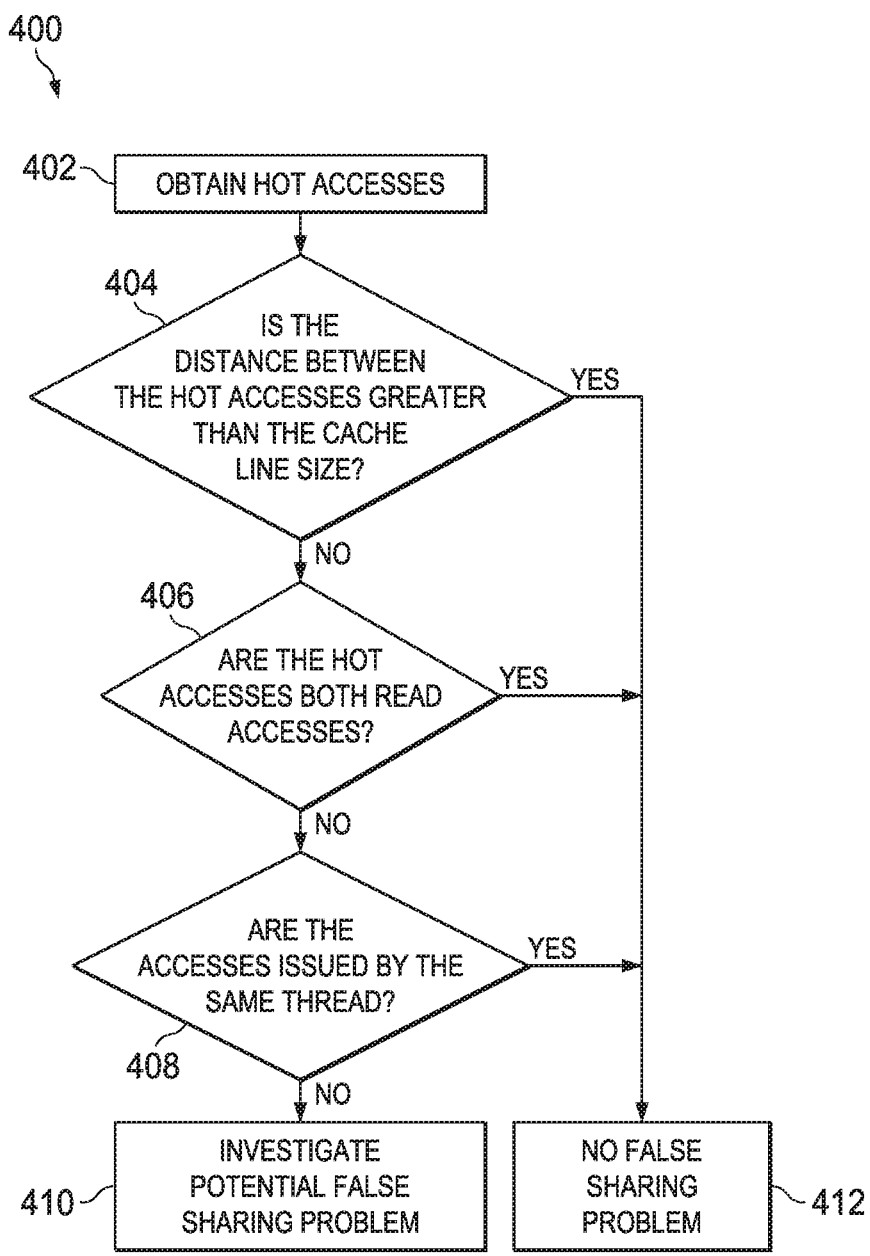
FIG. 19 illustrates a flowchart of another embodiment method of predicting false sharing.

FIG. 19 illustrates flowchart 400 for a method of determining potential false sharing. Initially, in step 402, the system obtains two hot accesses, X and Y. For example, X may be a hot access of the current cache line and Ya hot access in the previous cache line. In another example, X is a hot access of the current cache line and Y is a hot access in the next cache line. A hot access is an access made to the same address for more than the average number of accesses.

Then, in step 404, the system determines whether the distance d between X and Y is less than the cache line size sz. When d is greater than sz, the system proceeds to step 412, and there is no potential false sharing problem between X and Y. When d is less than or equal to sz, the system proceeds to step 406.

In step 406, the system determines whether X and Y are both read accesses. When both X and Y are read accesses, there is no false sharing problem, and the system proceeds to step 412. When at least one of X and Y is a write access, the system proceeds to step 408.

In step 408, the system determines whether X and Y are accesses issued by the same thread. When both X and Y are both issued by the same thread, there is no potential false sharing problem between X and Y, and the system proceeds to step 412. When the accesses are issued by different threads, the system proceeds to step 410 it investigate a potential false sharing problem. Steps 404, 406, and 408 may occur in any order.

In step 410, the system investigates a potential false sharing problem between X and Y. For example, the system track of cache invalidations for an assumed cache line under the new settings by tracking interleaved accesses. Then, the seriousness of the false sharing is ranked. Alternatively, the accesses of an object or cache line are periodically recorded, and the changing pattern of different words in corresponding cache lines is tracked. When the changing pattern of different words is consistently similar, multiple threads may access different words of this cache line simultaneously under the new settings. Then, there may be a high likelihood of possible false sharing.

The potential false sharing is then reported. For global variables involved in false sharing, the name, address, and size are reported. For heap objects, the callsite stack for their allocations, their address, and size are reported. Also, the word granularity access information for cache lines involved in false sharing, including which threads accessed which words, may be shared. This information may assist in diagnosing and fixing false sharing.

Figure 20:
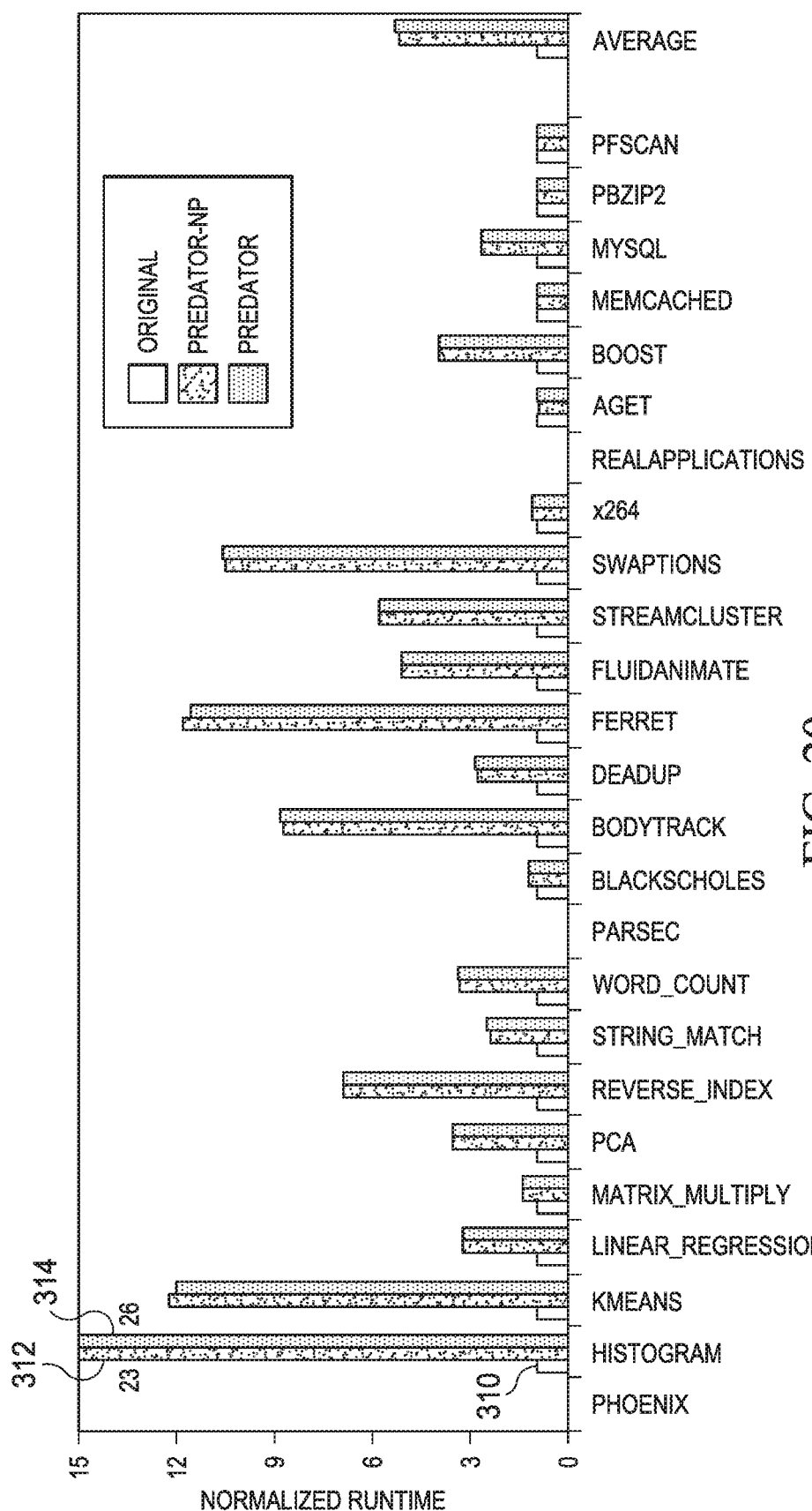
FIG. 20 illustrates a graph of performance overhead.

FIG. 20 illustrates a graph of the overhead performance of predator using normalized runtime. Bars 310 shows the baseline, bars 312 shows predator non-prediction (NP), and bars 314 shows predator. Predator has a performance overhead of about six times. For 16 benchmarks, predator imposes a 5.4 times performance overhead. Five programs, histogram, kmeans, bodytrack, ferret, and swaptions have more than an 8 times performance overhead. The histogram benchmark runs more than 26 times slower than the original executions with pthreads library, because tracking detailed access on cache lines with false sharing exacerbates false sharing. For bodytrack and ferret, although there is no false sharing, predator detects a large amount of cache lines with writes larger than tracking threshold. Thus, tracking those accessing details for those cache lines imposes performance overhead. Predator imposes a small performance overhead for input-output (IO)-bound applications such as matrix_multiply, blackscholes, x264, aget, Memcached, pbzib2, and pfscan, because predator does not add any performance overhead for IO operations. There is no significant difference on performance whether prediction is used.

Figure 21:
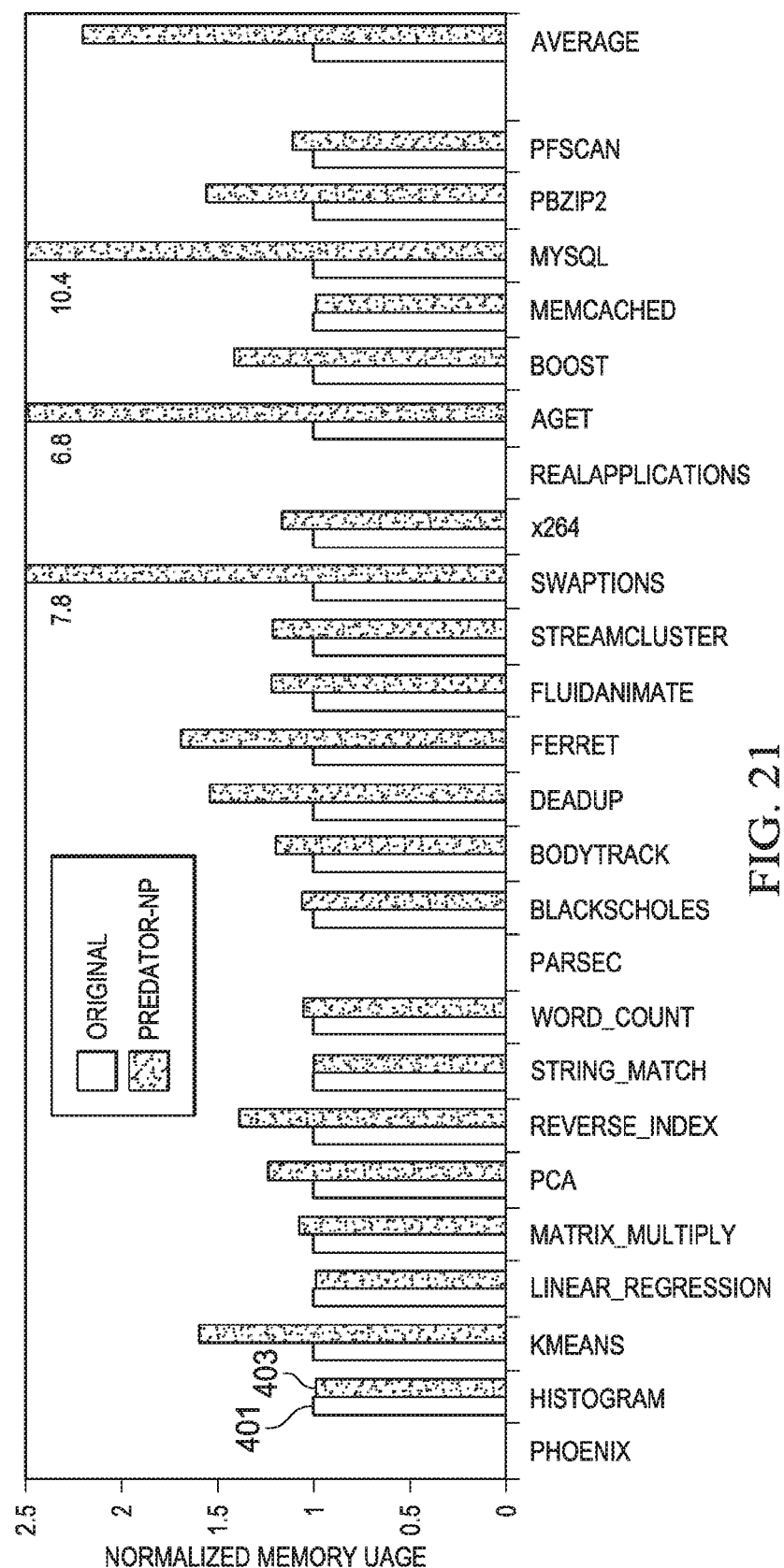
FIG. 21 illustrates a graph of memory usage overhead.

FIG. 21 illustrates the memory usage using normalized memory usage. Bars 401 shows the baseline and bars 403 shows the memory usage for predator. Predator imposes less than 50% memory overhead for 17 out of 22 applications. For swaptions and aget, predator introduces more memory overhead, because the original memory footprints are very small at only 3 kilobytes. Adding the code of detection, prediction, and reporting contributes to a large ratio of memory overhead. Although the average memory usage of applications is over two times, the total memory usage overhead is only about 40% on predator.

Figure 22:
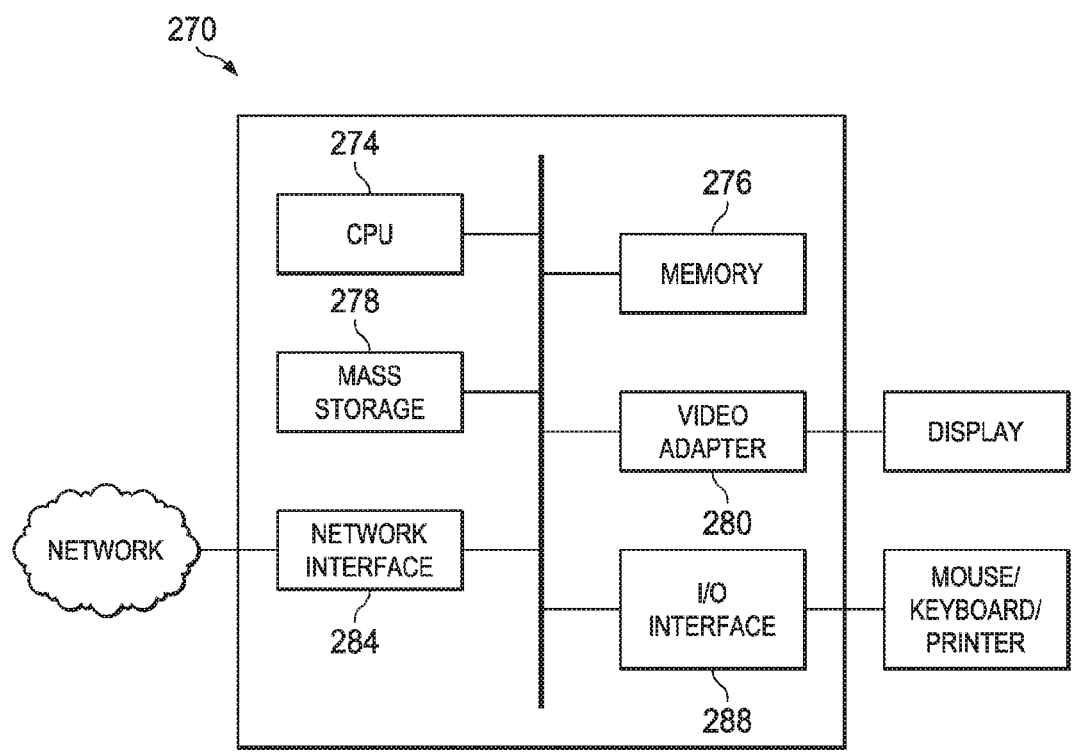
FIG. 22 illustrates a block diagram of an embodiment general-purpose computer system.

FIG. 22 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for predicting false sharing implemented by a computer, the method comprising:
   executing code, by the computer in a first run-time environment, on a plurality of cores of a central processing unit (CPU) of the computer;
   tracking, based at least on executing the code in the first run-time environment, cache line access information related to accessing a first cache line of the CPU, a second cache line of the CPU, or both the first cache line and the second cache line, the first cache line being adjacent to the second cache line;
   determining, based at least on tracking the cache line access information related to accessing the first cache line and the second cache line, that there is potential false sharing in a second run-time environment, wherein determining that there is potential false sharing in the second run-time environment is further based at least in part on simulating at least one property that is different between the first run-time environment and the second run-time environment; and
   reporting, based at least on determining that there is potential false sharing, the potential false sharing.

2. The method of claim 1, wherein: the cache line access information comprises write accesses to the first cache line;
   tracking, based at least on executing the code in the first run-time environment, the cache line access information comprises tracking a number of write accesses to the first cache line; and
   the method comprises:
   determining that the number of write accesses for the first cache line exceeds a tracking threshold and, based thereon,
      tracking detailed information for a first plurality of accesses to the first cache line, the cache line access information further comprising the detailed information for the first plurality of accesses to the first cache line.

3. The method of claim 2, wherein tracking the detailed information comprises tracking a plurality of access types of the first plurality of accesses, a plurality of threads performing the first plurality of accesses, and a plurality of words accessed by the first plurality of accesses.

4. The method of claim 2, further comprising:
   determining that a number of write accesses is greater than a predicting threshold while tracking the detailed information for the first plurality of accesses to the first cache line and, based thereon,
   determining that there is potential false sharing in the first cache line.

5. The method of claim 2, wherein the first cache line is stored at a first memory location of a main memory that is before a second memory location of the main memory at which the second cache line is stored.

6. The method of claim 2, wherein the first cache line is stored at a first memory location of a main memory that is after a second memory location of the main memory at which the second cache line is stored.

7. The method of claim 1, wherein the code comprises instrumentation.

8. The method of claim 1, wherein reporting the potential false sharing comprises reporting a name of a global variable, an address of the global variable, and a size of the global variable.

9. The method of claim 1, wherein reporting the potential false sharing comprises reporting a callsite stack for an allocation of a heap object, an address of the heap object, and a size of the heap object.

10. The method of claim 1, wherein reporting the potential false sharing comprises reporting a first task corresponding to a first access of a first word of the first cache line and a second task corresponding to a second access of a second word of the second cache line.

11. The method of claim 1, wherein reporting the potential false sharing comprises examining metadata corresponding to the first cache line and the second cache line.

12. The method of claim 1, comprising:
    determining a first word of the first cache line, wherein the first word of the first cache line has a number of accesses greater than a threshold; and
    searching a plurality of words within a memory size of the first cache line of the first word for potential false sharing.

13. The method of claim 1, wherein simulating at least one property that is different between the first run-time environment and the second run-time environment comprises tracking a virtual line having a virtual cache line size, wherein the virtual cache line size is the same as a memory size of the first cache line, wherein the virtual line has a starting address of X−((sz−d)/2) and an ending address of Y+((sz−d)/2, wherein X is a position of a first access to the first cache line, Y is a position of a second access to the second cache line, sz is the memory size of the first cache line, and d is a distance between the first access and the second access.

14. A method for predicting false sharing implemented by a computer, the method comprising:
    performing, by the computer, a first access to a first cache line by a first thread;
    performing, by the computer, a second access to a second cache line by a second thread, wherein the first cache line is adjacent to the second cache line;
    determining, by the computer, a distance between respective memory locations of the first access and the second access; and determining, by the computer, that the distance between the first access and the second access is less than a memory size of the first cache line and, based at least in part thereon, identifying, by the computer, a potential false sharing incident for a run-time environment that differs from a current run-time environment.

15. The method of claim 14, wherein the first access and the second access are hot accesses.

16. The method of claim 14, further comprising:

determining whether the first access is a read access or a write access; and determining whether the second access is a read access or a write access, wherein identifying the potential false sharing incident is based further on determining that the first access is a write access or the second access is a write access.

17. The method of claim 14, wherein identifying the potential false sharing incident comprises:

tracking invalidations in a virtual cache line to produce a plurality of tracked invalidations; and ranking the plurality of tracked invalidations.

18. The method of claim 14, wherein identifying the potential false sharing incident comprises:

recording a portion of accesses of the first cache line; and tracking a changing pattern of a plurality of accesses to the first cache line and the second cache line.

19. A computer comprising:

a processor; and a memory storing instructions, wherein the processor executes instructions to:

tracking, based at least on executing code in a first run-time environment, cache line access information related to accessing a first cache line of the processor, a second cache line of the processor, or both the first cache line and the second cache line, the first cache line being adjacent to the second cache line, determine, based at least on tracking the cache line access information related to accessing the first cache line and the second cache line, that there is potential false sharing in a second run-time environment wherein determining that there is potential false sharing in the second run-time environment is further based at least in part on simulating at least one property that is different between the first run-time environment and the second run-time environment, and report, based at least on determining that there is potential false sharing, the potential false sharing.

20. The method of claim 1 wherein the at least one property that is different between the first run-time environment and the second run-time environment is:

a cache line size; or a starting address of a potentially falsely-shared object.

* * * * *